US011216818B2

(12) United States Patent
Puthenveetil

(10) Patent No.: US 11,216,818 B2
(45) Date of Patent: Jan. 4, 2022

(54) SECURE PAYMENT MADE FROM A MOBILE DEVICE THROUGH A SERVICE PROVIDER

(71) Applicant: PAYPAL, INC., San Jose, CA (US)

(72) Inventor: Abhilash Puthenveetil, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 1199 days.

(21) Appl. No.: 14/853,981

(22) Filed: Sep. 14, 2015

(65) Prior Publication Data

US 2016/0005040 A1  Jan. 7, 2016

Related U.S. Application Data

(63) Continuation of application No. 13/536,908, filed on Jun. 28, 2012, now Pat. No. 9,135,622.

(51) Int. Cl.
*G06Q 20/40* (2012.01)
*G06Q 20/32* (2012.01)
*G06Q 20/38* (2012.01)

(52) U.S. Cl.
CPC ......... *G06Q 20/405* (2013.01); *G06Q 20/322* (2013.01); *G06Q 20/3829* (2013.01); *G06Q 20/40* (2013.01); *G06Q 20/4012* (2013.01); *G06Q 20/4014* (2013.01); *G06Q 20/3823* (2013.01)

(58) Field of Classification Search
None
See application file for complete search history.

(56) References Cited

U.S. PATENT DOCUMENTS

| | | | | |
|---|---|---|---|---|
| 6,760,711 B1 * | 7/2004 | Gillett | ............... | G06F 21/6209 705/64 |
| 2001/0007132 A1 * | 7/2001 | Regev | ............... | H04L 63/0442 726/7 |
| 2005/0131838 A1 * | 6/2005 | Woodward | ............ | G07F 19/00 705/71 |
| 2005/0256806 A1 * | 11/2005 | Tien | ................. | G06Q 20/04 705/64 |
| 2007/0284434 A1 * | 12/2007 | Fletcher | ............... | G06Q 20/12 235/379 |

(Continued)

*Primary Examiner* — Patrick McAtee
*Assistant Examiner* — Jason B Fenstermacher
(74) *Attorney, Agent, or Firm* — Haynes and Boone, LLP

(57) ABSTRACT

Methods and systems enable merchants to accept payments through a service provider from a consumer using an app on a mobile device, for example, without redirecting the consumer to the service provider and without collecting the customer's service provider password (a separate PIN may be used). An example of an app on a mobile device is given, but secure payments are also enabled for purchases and other transactions for a website, a merchant, or a service provider who needs to accept payments from customers. A two-key approach allows a merchant, using the two keys—a collection key for merchant apps and general servers and a private, more secure, charge key for merchant "back-end" systems—to collect a user's username and personal identification number (PIN) for acquiring payments through a service provider without compromising the user's service provider username and password (the PIN is distinct from the password).

20 Claims, 3 Drawing Sheets

(56) References Cited

U.S. PATENT DOCUMENTS

| | | | |
|---|---|---|---|
| 2009/0292642 A1* | 11/2009 | Han | G06Q 20/12 |
| | | | 705/71 |
| 2010/0280927 A1* | 11/2010 | Faith | G06Q 10/06375 |
| | | | 705/30 |
| 2010/0306531 A1 | 12/2010 | Nahari | |
| 2011/0202415 A1* | 8/2011 | Casares | G06Q 20/20 |
| | | | 705/17 |

* cited by examiner

SECURE PAYMENT MADE FROM A MOBILE DEVICE THROUGH A SERVICE PROVIDER

CROSS REFERENCE TO RELATED APPLICATIONS

This application is a continuation of U.S. patent application Ser. No. 13/536,908, filed Jun. 28, 2012, which is also hereby incorporated by reference in its entirety.

BACKGROUND

Technical Field

Embodiments of the present invention generally relate to online commerce conducted over a communication network such as the Internet and, more particularly, to enabling merchants to accept payments through a service provider without redirecting the consumer to the service provider.

Related Art

Shopping online, or electronically, has become more and more widely used, in part due to the ease with which a consumer can find items, pay, and complete a transaction without going to a seller's physical location. Such online shopping may be performed from a consumer's personal computer (PC) or laptop, for example, as well as, even more conveniently, from a mobile device, such as a smart phone. Thus, payment providers have developed payment products that enable the consumer to quickly, easily, and safely make an electronic payment for a purchase.

These payment providers, or payment products, generally require a consumer, when using a mobile app, or a web browser, to purchase items and make a payment, to be redirected to a service provider's website due to security concerns. At the service provider's website to which the consumer has been redirected, the consumer will generally be asked by the service provider to log on with a username and password in order to provide the consumer with a secure means for payment to the merchant. The user may then consent to the payment, at the service provider's site, for purchasing the item and is then redirected back to the merchant where the transaction is completed. One purpose for the redirect of the consumer to the service provider and back to the merchant is to provide the consumer more security against compromise of the consumer's service provider-username and password. In other words, it is desirable for the sake of increased security that the username (and password) used by the consumer to log on to the service provider site is not given to or passed through anyone other than the service provider. Some merchants and app developers, however, consider redirecting the customer to a third party site (e.g., the payment service provider) to be a sub-par user experience. Some app developers may even resent having to build a facility for third party redirect into their merchant app.

Figure 1:
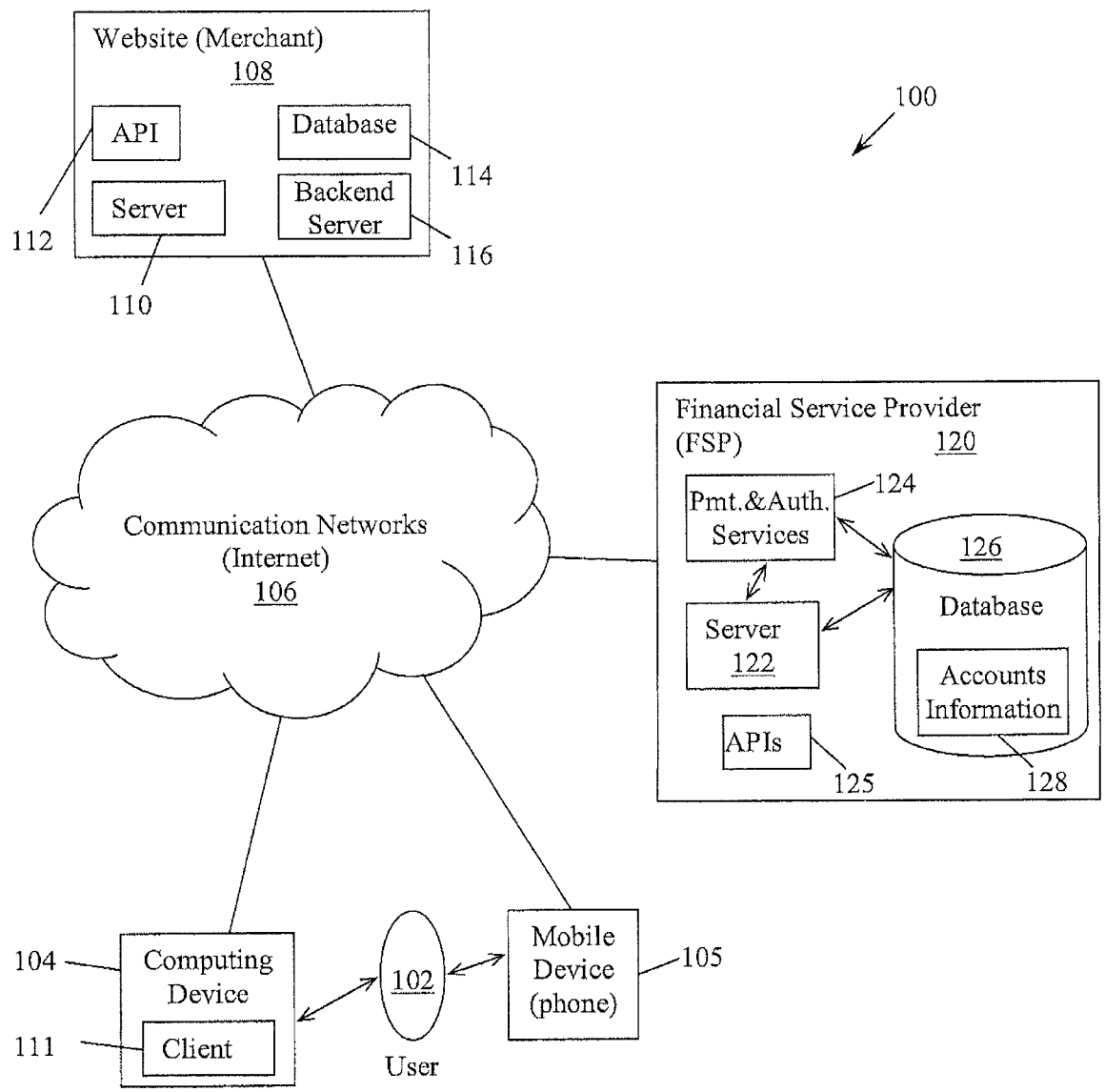
FIG. 1 is a system diagram illustrating a system for enabling a merchant to accept a payment through a service provider without redirect in accordance with an embodiment of the present invention.

Embodiments of the present disclosure and their advantages are best understood by referring to the detailed description that follows. It should be appreciated that like reference numerals are used to identify like elements illustrated in one or more of the figures, in which the showings therein are for purposes of illustrating the embodiments and not for purposes of limiting them.

DETAILED DESCRIPTION

Broadly speaking, methods and systems are provided in one or more embodiments to enable merchants to accept payments through a service provider from a consumer using an app, for example, on a mobile device without redirecting the consumer to the service provider. Some embodiments may enable merchants to securely accept payment for purchases through a payment service provider without collecting the customer's service provider password (instead, a separate PIN may be used) and without redirecting the customer. Moreover, embodiments are not limited to the example of an app on a mobile device, but may enable secure payment for purchases and other transactions for a website, a merchant, or a service provider who needs to accept payments from customers. Embodiments provide a two-key approach that may allow a merchant, using the two keys, to collect a user's username and personal identification number (PIN) for acquiring payments through a service provider without compromising the user's service provider username and password (the PIN is different from and independent from the password). Such payment provider services may include, for example, an online payment service operating between consumers and merchants and may be a service provided by a financial service provider (FSP)—such as PayPal, Inc. of San Jose, Calif.—in which a user of the service may have an account with the FSP (referred to as an "FSP account).

Accepting payment provider services of a service provider on mobile device apps (or merchant websites or service providers that need to accept payment from customers) can present a number of difficult technical problems. The app needs to identify itself to the payment service provider. Scammers can steal the app identification mechanism and build spoof apps to steal customers payment service provider-username and password. To prevent this, a payment service provider may force apps to send (redirect) the customer to the payment service provider website to complete payment for a transaction. Once the customer is on the payment service provider website, the payment service provider asks the customer to identify him or herself with username and password, confirms the customer's identity, collects money on the merchant's behalf, and sends (redirects) the customer back to the merchant Using redirects this way avoids letting the merchant have the ability to get a customer's password or identification information for the payment service provider website. Redirecting customers to a third party site for payment provider services is, however, considered by many merchants to be less than optimal or perhaps bothersome to their customers and a method for secure payment without customer redirection may be desirable. In general, the merchant does not want his app to redirect through a third party payment provider site, but conflictingly, third party payment provider sites generally do not want a merchant app to "collect" payment provider service-usernames and passwords.

In one or more embodiments, methods, systems, and computer program products are provided for: accepting, by a first processor, from a user device of a user, transaction information pertaining to a transaction; transmitting, from the first processor, using a first key that identifies a merchant to a service provider, the transaction information to the service provider; receiving, by the first processor, from the service provider an authorization information; and in response to receiving the authorization information: sending, from a second processor in communication with the first processor, using a second key that identifies the merchant to the service provider, the authorization information to the service provider for acquiring payment; and completing the transaction to which the transaction information pertains.

FIG. 1 illustrates a system 100 for online commerce and enabling a merchant to accept a payment through a service provider without redirecting the customer, according to one embodiment. A user 102 (generally a consumer or consumer user of FSP services) may communicate via a computing device 104 (e.g., a computer, cell phone, computing tablet, or other consumer electronic device) with financial service provider (FSP) 120 via communication network 106, which may be implemented as a single network or a combination of multiple networks. For example, network 106 may include the Internet as well as phone networks such as Public Switched Telephone Network (PSTN) or one or more intranets, landline networks, wireless networks, or other appropriate types of networks. User 102 may also communicate over communication network 106 using a mobile device 105, e.g., a mobile phone of any kind, that can receive messages such as Short Message Service (SMS) messages. In general, for purposes of embodiments described herein, computing device 104 and mobile device 105 need not be separate devices, although they can be, and may be the same device such as embodied by a smart phone, for example.

User 102 may also communicate via network 106 with a website 108 that may be a merchant website that is a seller of retail goods, for example. Merchant website 108 may sell goods online and may communicate with user 102, for example, by operating a server 110 (e.g., a computer processor) that presents a website for selling goods. The server 110 may respond to client devices (e.g., client 111 running on device 104) by communicating over network 106. Merchant website 108 may also maintain a database 114 and provide user accounts for its customers. Database 114 may provide convenience for customers of the merchant (e.g., merchant website 108) by allowing, for example, users to keep their shipping information on file with the merchant so as not to have to re-enter information with every order, or, for example, the merchant may like to offer promotions for users with an account on merchant website 108. Merchant website 108 may operate a backend server 116 that is limited in its communications over network 106 and may communicate with server 110 and database 114 through a firewall for providing more secure operations than would be possible with server 110.

Merchant website 108 may also communicate (for example, using server 110) with FSP 120 through FSP server 122 over network 106. For example, merchant website 108 may communicate with FSP 120 in the course of various services offered by FSP 120 to merchant website 108, such as payment intermediary between customers (e.g., consumer user 102) of merchant website 108 and merchant website 108 itself. For example, merchant website 108 may use an application programming interface (API) 112 that allows it to run apps and offer sale of goods in which customers are allowed to make payment through FSP 120, while consumer user 102 may have an account with FSP 120 that allows consumer user 102 to use the FSP 120 for making payments to sellers that allow use of authentication, authorization, and payment services 124 of FSP 120 as a payment intermediary. Also as shown in FIG. 1, FSP 120 may provide electronic data storage in the form of database 126. Database 126 may be used to keep track of user's accounts 128 with FSP 120, merchant's accounts with FSP 120, and transactions between customers, merchants, and stores including payments between the various entities, for example. FSP server 122 may execute various application programming interfaces (APIs) that may enable various different types of relationships between FSP 120 and the different parties shown in FIG. 1. In addition, FSP may provide various APIs 125 to its customers such as website 108 (e.g., API 112) that enable those websites to implement embodiments of authentication, authorization, and password reset services.

Figure 2:
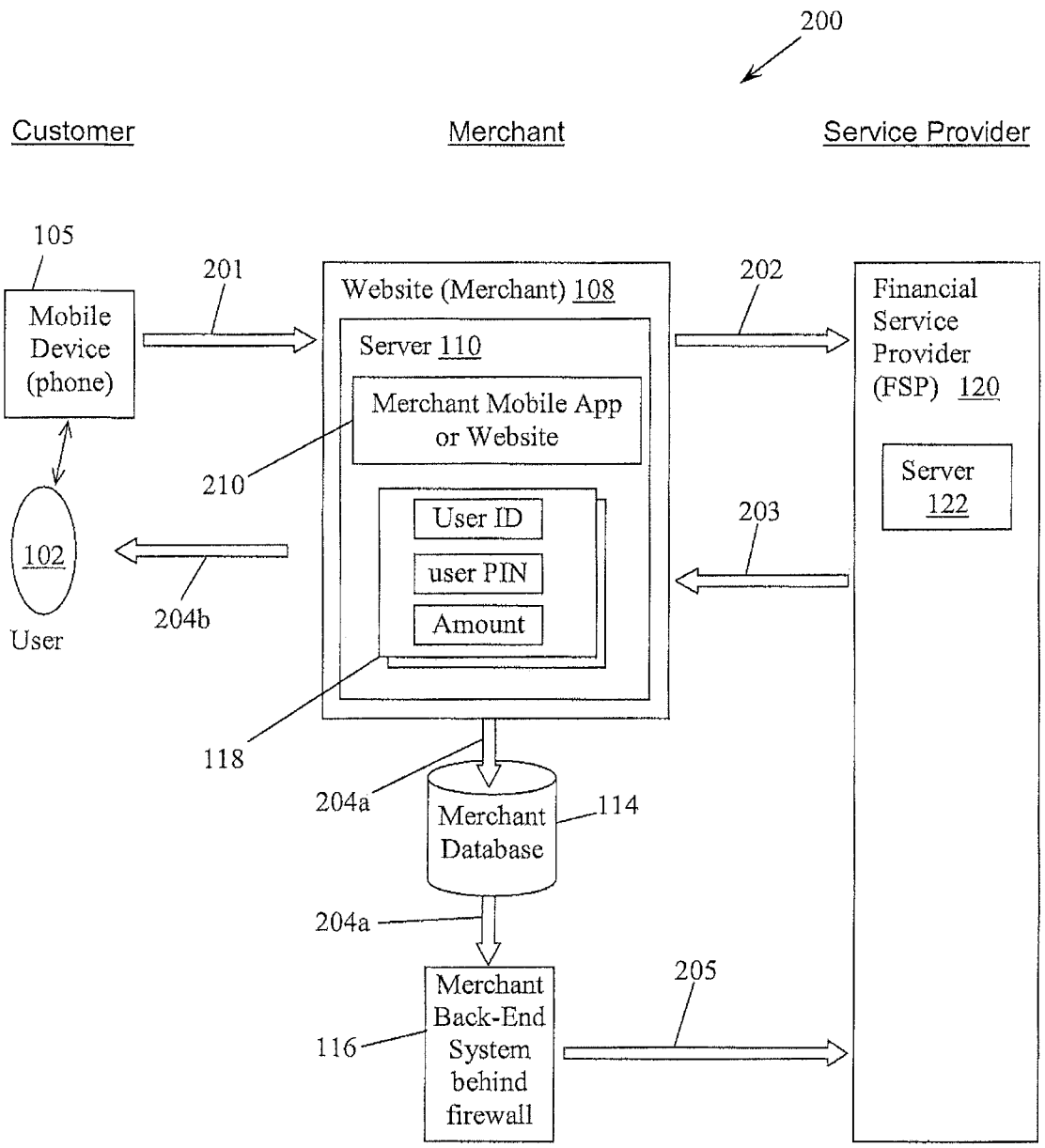
FIG. 2 is a data flow diagram illustrating a portion of a system for enabling a merchant to accept a payment through a service provider without redirect in accordance with an embodiment.

FIG. 2 illustrates an example of information flow in a system 200 for online commerce and enabling a merchant to accept a payment through a service provider without redirect or using the customer's service provider password, according to one or more embodiments. Embodiments may employ a two-key approach to enabling a merchant to accept a payment through a service provider without redirect or using the customer's service provider password that allows a merchant, using the two keys—a collection key for merchant apps and "front-end" servers (e.g., merchant server 110) and a private, more secure, charge key for merchant "back-end" (e.g., merchant backend server 116) systems—to collect a user's username and personal identification number (PIN) for acquiring payments through a service provider without compromising the user's service provider username and password (the PIN is distinct from the password).

In one example embodiment, the merchant (e.g., merchant 108) may be issued two alpha-numeric strings called keys by the service provider (e.g., FSP 120). A first key, which may be referred to as a "collection" key, may be used to identify the information collecting app (e.g., merchant app 210 or website) to the service provider (e.g., FSP 120). The collection key (also called "non-private key") may be considered less secure because it is used on the merchant's front end (e.g., server 110) that is used to interface to the public such as online shoppers, customers, and anyone else. Thus, it is possible that a hacker could eventually get access to the merchant's collection key or first key. A second key, which may be referred to as a "charge" key, also may be used to identify the information collecting app (e.g., merchant app 210 or website) to the service provider (e.g., FSP 120). The charge key (also called "private key") may be considered more secure because it may not be used in apps or websites. The charge key (second key) may be saved only on secure back-end servers (e.g., backend server 116). A merchant (e.g., merchant 108) may build an app (e.g., merchant app 210) which may accept a user identification (user ID) issued by the service provider (e.g., FSP 120) and PIN issued by the service provider. In other words, the user ID and PIN belong to—and are unique to—the user and identify the user to the service provider and provide authorization from the user to the service provider. The merchant app 210 may also accept an amount to be charged the user in the transaction as well as other transaction information such as item purchased, invoice number, and so on. A consumer user (e.g., a user having an FSP account with FSP 120) wishing to use the PIN feature (e.g., purchase from the merchant through the service provider without redirect to the service provider and without using the user password for the service provider) may give consent for using the PIN feature to the service provider and set a PIN which is different from their service provider password. The giving of such consent may even be performed through the merchant using an API, e.g., API 112, provided by the service provider to the merchant.

Thus, at 201 in FIG. 2, merchant 108 may use a mobile form 118—presented to user 102 on mobile device 105 from app 210, for example—to accept the service provider's user ID and PIN and other transaction information such as purchase or payment amount.

At 202 in FIG. 2, app 210 of merchant 108 may connect to the service provider (e.g., through server 122 of FSP 120) and, using the collection key, transmit the transaction information including the service provider's user ID and PIN for the customer (e.g., user 102) and a request for a payment authorization.

At 203 in FIG. 2, after the servicer provider (e.g., FSP 120) checks the customer's (e.g., user 102) user ID and PIN, the service provider may provide an authorization (or rejection, or declination) for payment for the requested amount or for otherwise completing the transaction to which the transaction information pertains. The authorization information (or declination) may be in the form of a key or code such as an alpha-numeric string. The service provider may check the customer's (e.g., user 102) user ID and PIN, for example, by searching its database 126 for accounts information 128 matching the user ID and PIN of user 102.

At 204a in FIG. 2, merchant 108 may save the authorization information (along with the transaction information) to the merchant's database 114. The merchant's backend system 116 may be able to access the authorization information in database 114 without compromising the second, private, charge key. At 204b in FIG. 2, merchant 108 may go ahead and, for example, provide the service or complete the sale in regard to the transaction to which the transaction information pertains or may choose to wait until final payment is completed.

At 205 in FIG. 2, merchant 108 may, from the merchant's back end system 116, connect to the service provider (e.g., through server 122 of FSP 120) and, using the charge key, send the authorization information (along with transaction information needed) to the service provider to complete payment on the transaction. The service provider may check if the (first) collection key used to create the authorization information matches the (second) charge key prerequisite to approving final payment to the merchant. For example, the service provider may search its database 126 for information showing that the authorization information and collection key of merchant 108 matches with the authorization information and collection key for the same merchant 108. In response to finding a match, the final payment may be completed. If a match is not found, service provider may, for example, reject the payment or take other steps to resolve any issues.

Figure 3:
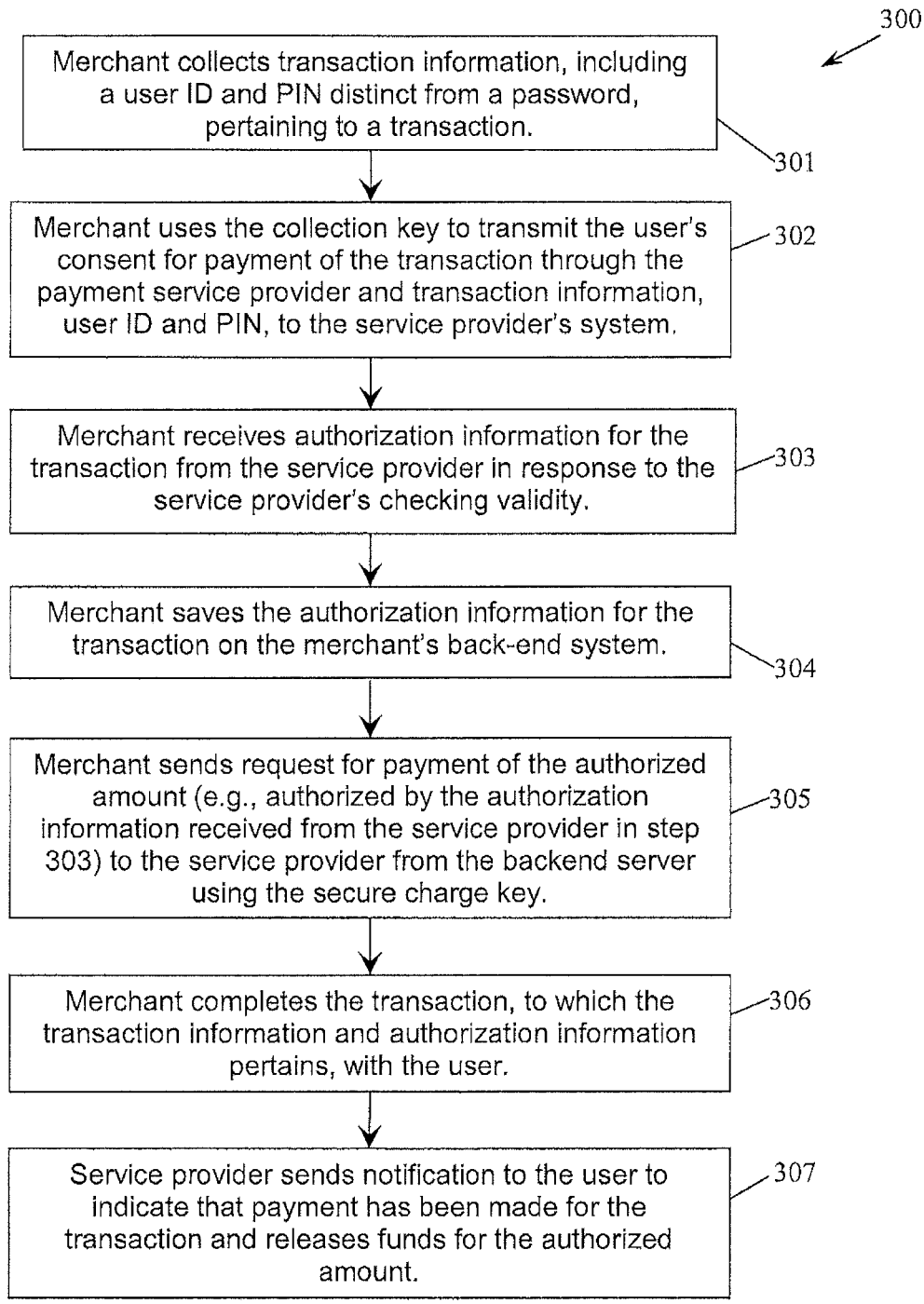
FIG. 3 is a flow chart illustrating a method for enabling a merchant to accept a payment through a service provider without redirect in accordance with an embodiment.

FIG. 3 illustrates a method 300 for enabling a merchant to accept a payment through a service provider without redirecting the customer, in accordance with an embodiment.

At step 301, a merchant (e.g., merchant 108) may collect transaction information pertaining to a transaction such as an online purchase. For example, merchant 108 may use a mobile form (e.g., mobile form 118) to accept from a user (e.g., user 102), without redirecting the user to a payment service provider (e.g., FSP 120), a tender of payment along with the user ID and PIN of the user that are intended to be recognized by the payment service provider. The user ID and PIN for the particular user may be distinct from and different from a user ID and password of the same user with the same service provider.

Thus, the PIN is useful only to give consent to a restricted set of merchants—those offering the PIN feature (e.g., purchase from the merchant through the service provider without redirect to the service provider and without using the user password for the service provider). If the PIN is compromised, for example, by a hacker, the hacker cannot charge the user's FSP account without creating a valid merchant account with the service provider and obtaining both a collection key and a charge key. The service provider is in full control of that process, however, so may readily detect such fraudulent attempts. Although a breached (compromised) PIN may be maliciously used on other valid merchant sites, creating havoc, that can easily be stopped by simply changing the compromised PIN for the user.

At step 302, the merchant (e.g., merchant 108) may use the collection key to transmit the user's (e.g., user 102) consent for payment of the transaction through the payment service provider (e.g., FSP 120) and transaction information, including the user ID and PIN, to the service provider's system (e.g., via server 122, payment provider services 124, and database 126 of FSP 120) using an API (e.g., API 112) or an app (e.g., app 210).

At step 303, the merchant (e.g., merchant 108) may receive authorization information for completing the transaction from the service provider in response to the service provider's having checked, for example, validity of the transaction information, user ID and PIN, and the collection key.

At step 304, the merchant (e.g., merchant 108) may save the authorization information for the transaction on the merchant's back-end system. The merchant may also save the transaction information, which may include the user ID and PIN. For example, merchant 108 may save the transaction and authorization information on merchant database 114 for access by backend server 116 or may save the transaction and authorization information directly to backend server 116 through a firewall, which may be implemented using hardware, software, or some combination of both.

At step 305, the merchant (e.g., merchant 108) may request payment of the authorized amount, for example, by requesting to charge the user's (e.g., user 102) FSP account with the authorized amount (e.g., authorized by the authorization information received from the service provider in step 303) by sending to the service provider (e.g., FSP 120) the payment request from the backend server 116 using the secure charge key and any additional information required by the service provider, e.g., the service provider's user ID and PIN for the user or the transaction information.

Thus, to breach security, a hacker, for example, would need both of the two keys, the collection key and the charge key. If the collection key alone is breached, the hacker may be able to build an app to steal a user ID and PIN. Such an attacker could not, however, complete the payment without the corresponding charge key. The difficulty of obtaining the charge key corresponding to the compromised collection key is the measure of the security attained by the two-key PIN feature (e.g., two-key approach to purchases from the merchant through the service provider without redirect to the service provider and without using the user password for the service provider). Even if both keys—collection key and private charge key—are breached, simply changing the private charge key may effectively neutralize the threat. Thus, app developers may not need to re-issue a new app with embedded collection key each time security is breached on their front end app.

At step 306, the merchant (e.g., merchant 108) may complete the transaction, to which the transaction information and authorization information pertains, with the user (e.g., user 102). Step 306 may be performed after step 305, for example, or concurrently with step 304, or in response, for example, to performance of any part of step 303, at the choice of the merchant.

At step 307, the service provider (e.g., FSP 120) may send notification to the user (e.g., user 102) to indicate that a charge has been made to the user's FSP account and may release the funds. For example, the service provider may send the user an email or an SMS text message that the authorized amount has been paid for the transaction.

In implementation of the various embodiments, embodiments of the invention may comprise a personal computing device, such as a personal computer, laptop, PDA, cellular phone or other personal computing or communication devices. The payment provider system may comprise a network computing device, such as a server or a plurality of servers, computers, or processors, combined to define a computer system or network to provide the payment services provided by a payment provider system.

In this regard, a computer system may include a bus or other communication mechanism for communicating information, which interconnects subsystems and components, such as a processing component (e.g., processor, microcontroller, digital signal processor (DSP), etc.), a system memory component (e.g., RAM), a static storage component (e.g., ROM), a disk drive component (e.g., magnetic or optical), a network interface component (e.g., modem or Ethernet card), a display component (e.g., CRT or LCD), an input component (e.g., keyboard or keypad), and/or cursor control component (e.g., mouse or trackball). In one embodiment, a disk drive component may comprise a database having one or more disk drive components.

The computer system may perform specific operations by processor and executing one or more sequences of one or more instructions contained in a system memory component. Such instructions may be read into the system memory component from another computer readable medium, such as static storage component or disk drive component. In other embodiments, hard-wired circuitry may be used in place of or in combination with software instructions to implement the invention.

Logic may be encoded in a computer readable and executable medium, which may refer to any medium that participates in providing instructions to the processor for execution. Such a medium may take many forms, including but not limited to, non-volatile media, volatile media, and transmission media. In one embodiment, the computer readable medium is non-transitory. In various implementations, non-volatile media includes optical or magnetic disks, such as disk drive component, volatile media includes dynamic memory, such as system memory component, and transmission media includes coaxial cables, copper wire, and fiber optics, including wires that comprise bus. In one example, transmission media may take the form of acoustic or light waves, such as those generated during radio wave and infrared data communications.

Some common forms of computer readable and executable media include, for example, floppy disk, flexible disk, hard disk, magnetic tape, any other magnetic medium, CD-ROM, any other optical medium, punch cards, paper tape, any other physical medium with patterns of holes, RAM, ROM, E2PROM, FLASH-EPROM, any other memory chip or cartridge, carrier wave, or any other medium from which a computer is adapted to read.

In various embodiments, execution of instruction sequences for practicing the invention may be performed by a computer system. In various other embodiments, a plurality of computer systems coupled by a communication link (e.g., LAN, WLAN, PTSN, or various other wired or wireless networks) may perform instruction sequences to practice the invention in coordination with one another.

Modules described herein can be embodied in one or more computer readable media or be in communication with one or more processors to execute or process the steps described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/ or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa—for example, a virtual Secure Element (vSE) implementation or a logical hardware implementation.

Software, in accordance with the present disclosure, such as program code and/or data, may be stored on one or more computer readable and executable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Having thus described various example embodiments of the disclosure, persons of ordinary skill in the art will recognize that changes may be made in form and detail without departing from the scope of the invention. Thus, the invention is limited only by the claims.

What is claimed is:

1. A service provider system, comprising:
   a non-transitory memory storing a user credential for a user, a first key, and a second key; and
   one or more hardware processors coupled to the non-transitory memory and configured to read instructions to cause the service provider system to perform operations comprising:
   receiving the user credential and a third key from a first processor of a merchant device for a merchant transaction processing application executed by the merchant device corresponding to a merchant for a transaction between the user and the merchant, wherein the user credential comprises a personal identification number (PIN) issued to the user for use with the merchant transaction processing application;

verifying that the third key matches the first key, wherein the first key was previously issued to the first processor of the merchant device by the service provider system;

verifying that the merchant is an authorized merchant for the PIN;

generating an authorization of the transaction, wherein the authorization comprises an alphanumeric string;

providing the authorization to the first processor based on the user credential and the first key;

receiving the authorization from a second processor of the merchant device with a fourth key;

verifying that the fourth key matches the second key previously issued to the second processor of the merchant device by the service provider system, wherein the second processor comprises a secure back-end server of the merchant separated via a firewall from the first processor, and wherein the second key is inaccessible by the first processor and the merchant transaction processing application of the merchant;

determining whether the third key and the fourth key match and correspond to the merchant; and processing the transaction between the user and the merchant based on the determining whether the third key and the fourth key match and correspond to the merchant.

2. The service provider system of claim 1, wherein the second processor of the merchant device has limited communications over a network through the firewall.

3. The service provider system of claim 1, wherein the first key is used in at least one of a mobile application for the merchant or a website for the merchant associated with the merchant transaction processing application.

4. The service provider system of claim 1, wherein the transaction is processed using a payment account for the user with the service provider system, and wherein the user credential identifies the payment account.

5. The service provider system of claim 4, wherein the PIN is issued to the user by the service provider system and is distinct from at least one of a username for the payment account or a password for the payment account.

6. The service provider system of claim 5, wherein the PIN enables identifying the payment account during merchant transactions including the transaction with the merchant.

7. The service provider system of claim 6, wherein the authorization is provided based at least in part on the PIN being matched to the user and the first key being matched to the merchant.

8. The service provider system of claim 1, wherein the operations further comprise:

providing a payment to the merchant based at least in part on the third key and the fourth key matching and corresponding to the merchant.

9. The service provider system of claim 1, wherein the processing comprises:

determining that the second key was previously issued to the merchant, wherein the transaction is processed based at least in part on the determining that the second key was previously issued to the merchant.

10. The service provider system of claim 1, wherein the processing comprises:

receiving the authorization from the merchant device;

determining that the fourth key transmitted with the authorization does not match the second key previously issued to the merchant; and marking at least one of the transaction, the merchant device, and the merchant as fraudulent.

11. A method comprising:

receiving a user credential and a first key from a first processor of a merchant device for a merchant transaction processing application executed by the merchant device corresponding to a merchant for a transaction between the user and the merchant, wherein the user credential comprises a personal identification number (PIN) issued to the user for use with the merchant transaction processing application;

verifying that the first key matches a second key, wherein the second key was previously issued to the first processor by a service provider;

verifying that the merchant is an authorized merchant for the PIN;

generating an authorization of the transaction, wherein the authorization comprises an alphanumeric string;

providing the authorization to the first processor based on the user credential and the second key;

receiving the authorization from a second processor of the merchant device with a third key;

verifying that the third key matches a fourth key previously issued to the second processors of the merchant device by the service provider, wherein the second processor comprises a secure back-end server of the merchant separated via a firewall from the first processor, and wherein the fourth key is inaccessible by the first processor and the merchant transaction processing application of the merchant;

determining whether the first key and the third key match and correspond to the merchant; and processing the transaction between the user and the merchant based on the determining whether the first key and the third key match and correspond to the merchant.

12. The method of claim 11, wherein the second processor of the merchant device has limited communications over a network through the firewall, and wherein the second key is used in at least one of a mobile application for the merchant or a website for the merchant associated with the merchant transaction processing application.

13. The method of claim 11, wherein the transaction is processed using a payment account for the user with the service provider, and wherein the user credential identifies the payment account.

14. The method of claim 13, wherein the PIN is issued to the user by the service provider and is distinct from at least one of a username for the payment account or a password for the payment account.

15. The method of claim 14, wherein the PIN enables identifying the payment account during merchant transactions including the transaction with the merchant.

16. The method of claim 15, wherein the authorization is provided based at least in part on the PIN being matched to the user and the first key being matched to the merchant.

17. The method of claim 11, further comprising:

providing a payment to the merchant based at least in part on the first key and the third key corresponding to the merchant.

18. The method of claim 11, wherein the processing comprises:

determining that the fourth key was previously issued to the merchant, wherein the transaction is processed based at least in part on the determining that the fourth key was previously issued to the merchant.

19. The method of claim 11, wherein the processing comprises:
   receiving the authorization from the merchant device;
   determining that the third key transmitted with the authorization does not match the fourth key previously issued to the merchant; and
   marking at least one of the transaction, the merchant device, and the merchant as fraudulent.

20. A non-transitory machine-readable medium having stored thereon machine-readable instructions executable to cause a machine to perform operations comprising:
   receiving a user credential and a first key from a first processor of a merchant device for a merchant transaction processing application executed by the merchant device corresponding to a merchant for a transaction between the user and the merchant, wherein the user credential comprises a personal identification number (PIN) issued to the user for use with the merchant transaction processing application;
   verifying that the first key matches a second key, wherein the second key was previously issued to the first processor by a service provider;
   verifying that the merchant is an authorized merchant for the PIN;
   generating an authorization of the transaction, wherein the authorization comprises an alphanumeric string;
   providing the authorization to the first processor based on the user credential and the second key;
   receiving the authorization from a second processor of the merchant device, wherein the authorization is transmitted with a third key;
   verifying that the third key matches a fourth key previously issued to the merchant device by the service provider, wherein the second processor comprises a secure back-end server of the merchant separated via a firewall from the first processor, and wherein the fourth key is inaccessible by the first processor and the merchant transaction processing application of the merchant;
   determining whether the first key and the third key match and correspond to the merchant; and
   processing the transaction between the user and the merchant based on the determining whether the first key and the third key match and correspond to the merchant.

* * * * *